Figure 1:
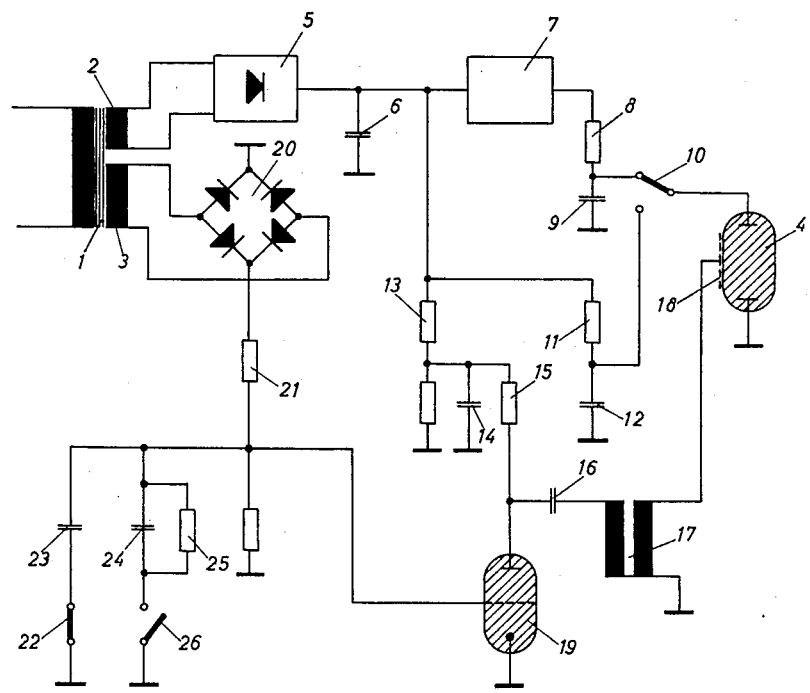

May 9, 1961 W. LUDLOFF 2,983,849
ELECTRONIC FLASH-LIGHT UNIT FOR USE IN PHOTOGRAPHY
Filed Feb. 11, 1959 3 Sheets-Sheet 1

INVENTOR:
Wolfgang Ludloff
BY
Jones, Darby & Robertson

May 9, 1961 W. LUDLOFF 2,983,849
ELECTRONIC FLASH-LIGHT UNIT FOR USE IN PHOTOGRAPHY
Filed Feb. 11, 1959 3 Sheets-Sheet 3

INVENTOR:
Wolfgang Ludloff
BY
Jones, Darby & Robertson

United States Patent Office 2,983,849
Patented May 9, 1961

2,983,849

ELECTRONIC FLASH-LIGHT UNIT FOR USE IN PHOTOGRAPHY

Wolfgang Ludloff, Wahn-Heide, Germany, assignor to Gesellschaft für Multiblitz-Gerate, Dr. Ing. D. A. Mannesmann m.b.H., Porz-Westhoven, Germany Filed Feb. 11, 1959, Ser. No. 792,583

Claims priority, application Germany Feb. 21, 1958

19 Claims. (Cl. 315—230)

This invention is concerned with an electronic flash-light unit for use in photography and more particularly relates to such a device which is intended to be used for studio exposures.

As is well known with such electronic flash devices, a storage condenser discharges impulsively via a rare-gas filled flash tube thereby producing a light flash with extraordinary luminous intensity and the duration of which amounts only to fractions of one hundredth of a second. In order to produce a determined luminous effect, it is common practice for studio exposures to use several of such flash-light units which are ignited jointly.

Owing to the great intensity and the short duration of the flashes, it is practically impossible to check by visual inspection whether actually all flashes were ignited when the camera was released, in particular, this is also impossible because normally, the eye of the photographer is only directed to the object to be photographed, and moreover it is not advisable to view into the flash lights when releasing them. It is thus possible that due to the failure of one of the flashes, for instance, the image is underexposed or that undesirable shadows are produced. But this is only detected after the negative has been developed.

But then, i.e., after such an error in exposure has been detected, generally the studio and the exposure apparatus are already installed and adjusted in quite a different manner for taking other exposures, so that a repetition of the first mentioned exposure would necessitate a repetition of the entire adjusting and installation work. Frequently, such a repetition is not all possible, because the persons or objects to be photographed are no longer available.

It has therefore already been suggested to equip each of the flash lights with an indicating device which is visible even from a certain distance, and which indicates whether or not the respective lamp has been ignited. In order to achieve this, it has been suggested to connect a relay in parallel to the storage condenser, the relay being energized by the voltage of the storage condenser and switches on an indicating means which may be a pilot lamp, for instance. It can then be seen by inspecting these pilot lamps whether or not the storage condenser is charged, and it is necessary before the exposure to check whether all pilot lamps are lighting up, and after the exposure, to see whether all of the pilot lamps have extinguished.

However, the suggested arrangement only indicates that the storage condenser is charged and thus gives a signal after the flash has been ignited, but it fails to supply any signal in the event the respective flash light has not been ignited.

The invention has therefore for its object, among others, to provide a revertive-signal system for the flash release which only supplies a signal when a flash, although it has been released, has not been ignited.

Quite similar problems also arise in other connections, for instance, with electronic flash-light units with exposure-setting illumination.

In order to give the photographer to possibility, particularly when several flash-light units are employed, already before making the exposure to evaluate the illumination of the image to be excepted and to adjust the individual flash lights accordingly, it is well known to provide in the flash lamp a continuously lighting exposure-setting lamp in addition to the flash tube. It is also well known, by means of periodic weaker auxiliary discharges to produce a stroboscopic exposure-setting illumination in the flash tube.

Such an exposure-setting illumination, however, constitutes above all a heavily fluctuating load to the transformer and rectifier arrangement. It is therefore a further object of the invention to avoid an additional switching on of the exposure-setting illumination immediately after releasing the flash, i.e., when the storage condenser for the main flash is charged with high capacity and the transformer and rectifier arrangement is already under heavy load.

In an electronic flash-light unit of the kind referred to above incorporating a relay that is energized by the voltage of the storage condenser, the arrangement is so conceived and constructed in accordance with the present invention that the relay (operating relay) governs the current supply to an auxiliary circuit in which additional control contacts are arranged which latter contacts are operated by the switch means provided for the operation of the flash-light unit.

It is then possible to operate the control contact of an auxiliary circuit by the flash releasing contact. A signalling device, preferably an incandescent lamp, may be arranged in this auxiliary circuit which is closed when the flash releasing contact is operated.

If now upon releasing the flash the auxiliary circuit is closed and the flash is ignited, the signalling device is not operated, because the storage condenser is discharged by the flash and the operating relay releases, so that voltage is no longer supplied to the auxiliary circuit. Only if in spite of the releasing operation the storage condenser remains in its charged condition, and thus the flash tube has not been ignited, the pilot lamp lights up.

The auxiliary circuit comprising the signalling device is advantageously indirectly closed by the operation of the flash releasing contact. This is accomplished thereby that a self-retaining relay (repeating relay) is arranged in a second auxiliary circuit which is also fed through a working contact of the operating relay. Said repeating relay is energized to attract when the flash releasing contact is operated and thereby closes the auxiliary circuit comprising the signalling device. It is thereby achieved that the auxiliary circuit with the signalling device will at any rate again open automatically when the flash tube has been correctly ignited, so that the revertive-signal circuit is immediately ready for operation when the following flash is released.

In accordance with a further development of the invention, a second signalling device, preferably an incandescent lamp having another colour than that of the first signalling device, may be arranged in the auxiliary circuit and connected in parallel to the first signalling device, the arrangement being so conceived that the two signalling devices of the repeating relay may be alternatingly operated, so that a green lamp, for instance, lights up to indicate that the flash-light unit is ready for operation.

With a flash-light unit equipped with exposure-setting illumination, a relay (commutator relay) to be actuated by a hand operated switch may be arranged in similar manner in an auxiliary circuit, and by which the flash-light unit may be switched from flash operation to exposure-setting illumination. If such an arrangement is provided, the exposure setting illumination is only switched on by operating the respective switch when the operating relay has attracted and thereby voltage has been impressed across the auxiliary circuit of the commutator relay. If now the auxiliary circuit of the commutator relay is fed through a normally closed contact of the repeating relay, it is additionally ensured that switching on the exposure-setting illumination is not possible as long as the signalling device indicates a failure of the flash.

In an electronic flash-light unit in which the exposure-setting illumination is produced in a manner which is known per se, and that is by periodic stroboscopic auxiliary discharges in the flash tube, a high-capacity storage condenser for the flash discharge is connected across the flash tube by the relay when the latter is in its released position, and a smaller condenser for the auxiliary discharge is impressed across the flash tube when the relay is in its attracted position. Here, the ignition of the stroboscopic exposure-setting illumination may be effected through a thyratron which is controlled by means of a pulsating negative direct current, where provision is made for a smoothening condenser to be connected to the grid of the tube via a normally closed contact of the commutator relay which blocks the smoothened control voltage of the thyratron.

If particularly high electric capacities have to be stored, which applies particularly for flash-light units intended for studio use, it is conventional practice to connect several condensers in parallel. This is done, because generally several condensers of smaller capacity, of 600 µf., for instance, are cheaper than one condenser of correspondingly greater capacity. In addition, the inductivity of condensers, which is due to the condenser windings, becomes too great with high-capacity condensers, and this is the reason why commercially available high-capacity electrolytic condensers are composed of several parallel connected windings of smaller capacity which are accommodated to a common housing.

But it has been found that the possibility of the parallel connection of storage condensers for the purpose of increasing the capacity of electronic flash-light units is not unlimited.

Actually, if a greater number of electrolytic condensers is connected in parallel and these are then impulsively discharged through an electronic flash tube, the condensers neighbouring the flash tube will, already after a short time of service, be subject to overload and damage if the number of parallel connected condensers surpasses a definite limit. Experience has shown that five electrolytic condensers each having a capacity of 600 µf. appears to be the permissible limit. If condensers of smaller capacity are used, a slightly greater number of units may be connected in parallel, while with condensers of higher capacity a somewhat smaller number may be connected in parallel, e.g., only three condensers each having a capacity of 1000 µf. If a greater number of parallel connected electrolytic condensers is used, one of the condensers will normally be destroyed already after some hundreds of flashes have been released.

The phenomenon could be ascribed to the influence of the wire connections between the individual parallel connected condensers. In the moment of ignition, as is well known, the flash tube has an extraordinarily low resistance which is of the order of some milliohms. The ohmic resistance of the wire connections is of the same order. The consequence of this is that the condenser lying next to the flash tube is earlier discharged than the following condensers which are separated from the flash tube by additional line resistances.

These condensers will now first of all discharge impulsively only through a series resistance of only a few milliohms into the first condenser. Such an impulsive charging, however, is harmful to electrolytic condensers, and that is probably because thereby voltage impulse of wrong polarity are produced which is due to the inductivity of the condenser.

A still further object of the invention is therefore the provision of a high-duty electronic flash unit incorporating a greater number of electrolytic condensers having the function of storage condensers and in which the disadvantages described above are eliminated.

According to the invention it is therefore suggested that in those cases where a greater number of electrolytic condensers is employed, which, when connected in parallel, would include the danger of damage to the condensers arranged next to the flash tube, the electrolytic condensers are combined to form several groups of parallel connected condensers, each of which groups discharging at the same time via a separate path of discharge.

With the at present commercially available electrolytic condensers it is normally necessary that the electrolytic condensers are combined to form groups of less than five condensers if more than six condensers are used.

The arrangement according to the invention has still further advantages. It is possible instead of one special high-duty flash tube to use several flash tubes of the standard type which are essentially cheaper. Moreover, due to the lower resistance of these tubes, short durations of flash are obtained even with relatively low service voltages (e.g. 500 volts).

It has been found that the ignition of separate flash tubes takes place with sufficiently accurate synchronism. For this purpose, the arrangement is so conceived that an operating relay is connected in parallel to all of the storage condensers and which is so designed that it attracts only if all condensers are charged, but that only one condenser is sufficient to retain it in its attracted position.

This may be accomplished thereby that a resistor is provided which is connected in series with the operating relay and which resistor is bridged by a working contact of the relay.

In accordance with a still further development of the invention, it is possible to make provision that the relay (operating relay), which is energized by the voltage of the storage condenser, comprises a contact means making the flash release contact ineffective, and which is preferably connected in parallel to the flash releasing contact, so that releasing the flash is only possible if the storage condenser is charged. In addition, the release of the camera shutter may be effected in a manner which is known per se by means of an electromagnetic release. The energizing current for the electromagnetic release may be conducted via a working contact of the operating relay, so that spoiling the film material due to the failure of the flash or due to too early a release of the camera is avoided.

Since, as is well known, flash efficiency varies considerably as a function of the operating voltage, it is highly desirable to charge the storage condenser with a stabilized voltage so as to avoid variation of the intensity of illumination due to mains voltage fluctuations and also to eliminate any overloading of the condenser. It has been found particularly suitable for the purpose of voltage stabilization to use a tube stabilizer which is known per se. Actually, a tube stabilizer offers the advantage over otherwise common glow-lamp stabilizers in that the voltage impressed across the storage condenser in the event of the failure of a tube is eliminated, while in the event of failure of a glow-lamp of the glow-lamp stabilizer, the full voltage is impressed across the storage condenser and which may lead to a destruction of this storage condenser. It is thus possible, when using a tube stabilizer, to better utilize the capacity of the condenser than would be possible when a glow-lamp stabilizer is employed.

If it is intended to use such a stabilizer in a flash-light unit with stoboscopic exposure-setting illumination of the aforementioned well known kind, the stabilizer should also be designed for the exposure-setting illumination. It has been found that the stabilizer, in order to comply with these demands, should be of considerably greater size as compared with a stabilizer intended for sole flash operation.

It is still another object of the invention, in an electronic flash-light unit with stroboscopic exposure-setting illumination and voltage stabilization to avoid such an oversizing of the stabilizer and which is of particular importance if a tube stabilizer is used.

It has been found that in practice a voltage stabilization is only necessary for the main flash where the constancy of the flash efficiency is important and where the capacity of the storage condenser has to be utilized up to the limit of the capacitance of the condenser.

It has further been found that the load fluctuation caused by the exposure setting illumination can be so balanced already with a relatively small condenser that any overloading of the switch elements and, in particular, of the transformer and of the rectifier is eliminated.

According to the invention therefore, charging of the storage condenser for the main discharge is effected through a voltage stabilizer, while the voltage for the stroboscopic exposure-setting illumination is tapped before the stabilizer, and a smoothing condenser for the smoothing of the load fluctuations caused by the exposure-setting illumination being series connected to this tap. A relatively simple and non-expensive circuit arrangement is in this way accomplished. Experience has evidenced that it will be sufficient when the smoothing condenser is about one hundred times smaller than the storage condenser provided for the main discharge, the storage condenser for the auxiliary discharge being of half the size of the smoothing condenser.

An embodiment of the invention is illustrated in the accompanying drawings and more fully described in the following detailed description.

Figure 2:
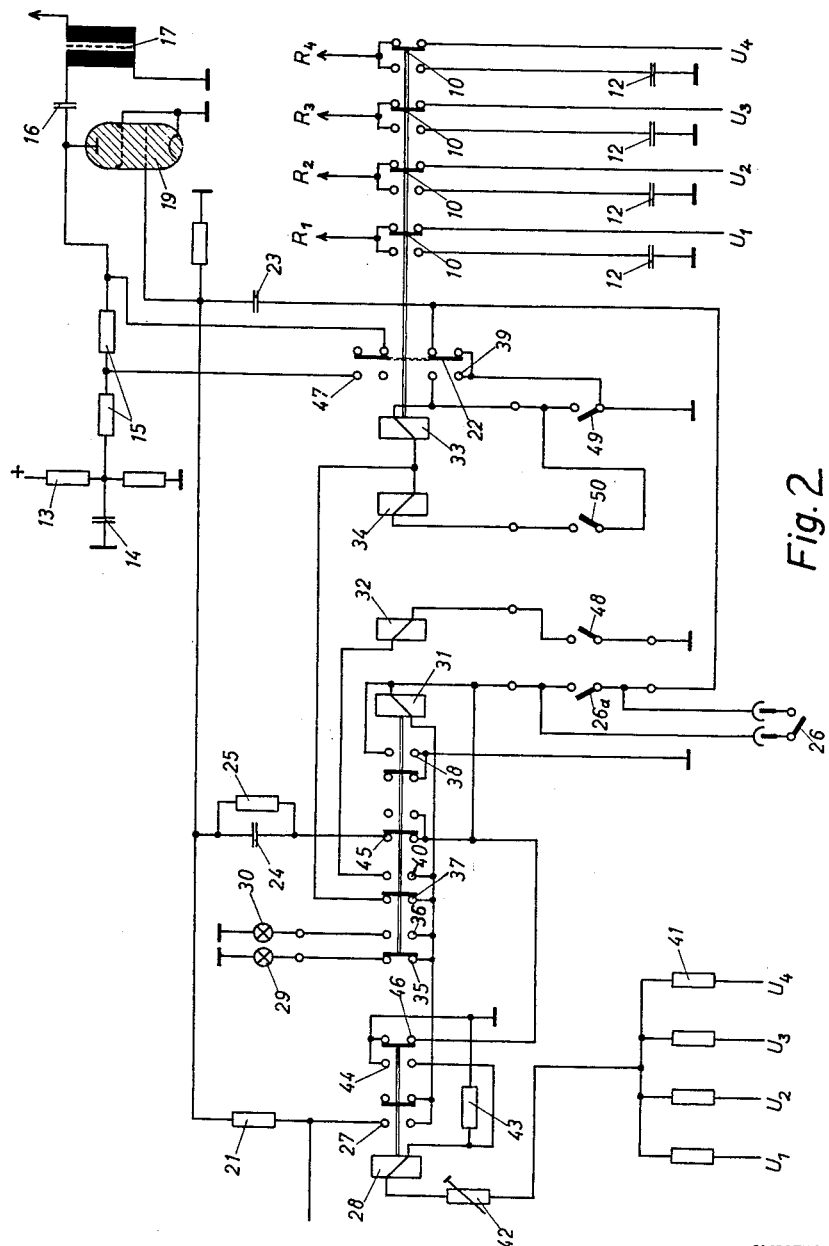
Figure 3:
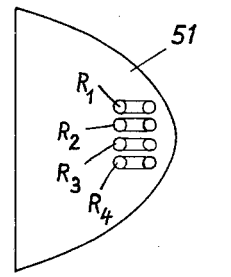
Figure 4:
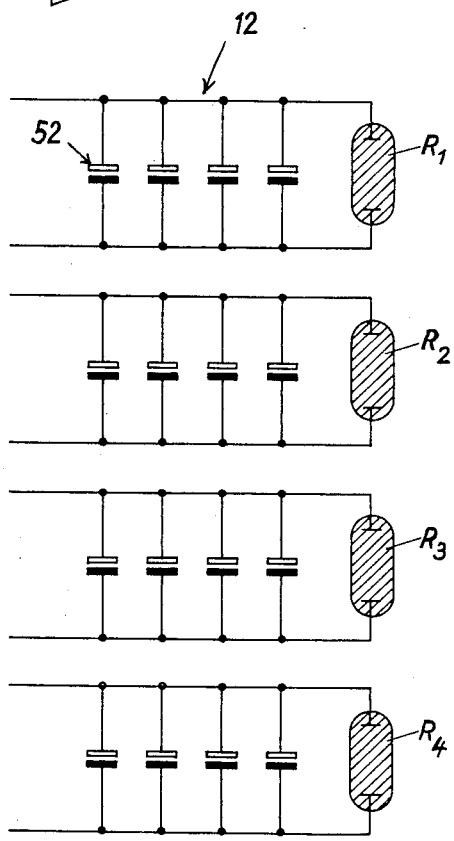

In the drawings:

Fig. 1 is a schematic representation of the circuit arrangement of an electronic flash-light unit with stroboscopic exposure-setting illumination, Fig. 2 shows a revertive-signal device according to the invention and the switch elements for the exposure-setting illumination in a circuit arrangement according to Fig. 1, Fig. 3 shows in schematic illustration the arrangement of four flash tubes in one reflector as suggested in accordance with the present invention, and Fig. 4 shows the circuit arrangement belonging thereto.

In the embodiment selected for illustration, numeral 1 designates a transformer (Fig. 1) which has two secondary windings 2, 3 of which one (2) supplies the operation voltage for the flash tube 4 while the other (3) supplies a voltage for the control of the ignition circuit. The voltage of the winding 2 is fed into a tube rectifier arrangement 5 which charges a condenser 6 having a capacity of 16 μf., for instance, and the function of which will be described herein further below. The storage condenser 9 for the main flash discharge, which is designed as an electrolytic condenser with a capacity of about 2000 μf., is charged via a voltage stabilizer 7 and a charging resistor 8 (250 ohms). The condenser 9 is connected across the tube 4 through a commutator switch 10.

Another smaller condenser 12 (about 10 μf.) is connected across the operating voltage in series with the stabilizer 7 and through charging resistor 11 (250 ohms) and which condenser is connected across the second contact of the commutator switch 10.

The ignition condenser 16 is charged via a charging resistor 15 and through a voltage divider 13 to which is connected a condenser 14 of about 4 μf. The ignition condenser is connected in series with the primary winding of the ignition coil 17 the secondary winding of which is connected in common manner to an ignition electrode 18.

A thyratron 19 is connected in parallel to the ignition condenser (2 μf.) and the ignition coil 17.

A negative pulsating direct current voltage is impressed across the grid of the thyratron 19 during the exposure-setting operation. This direct current is produced from a 50 cycles-alternating current voltage which is tapped from the winding 3 of the transformer 1 and is supplied through a voltage divider 21.

A smoothing condenser 23 may be cut in circuit between the grid and the cathode of the thyratron 19 by means of a switch 22.

A second condenser 24, which is bridged by a high-ohmic resistor 25, may be cut in circuit in parallel to the condenser 23. The parallel connection of the condenser 24 is effected by means of the contact 26 which is preferably formed by the camera contact.

The operation of the arrangement described is as follows:

*Exposure-setting illumination*

In order to operate the exposure-setting illumination, the commutator switch 10 is set to the lower contact; the switch 22 is opened. The flash tube is then connected across the condenser 12.

A negative direct current voltage pulsating with a frequency of 100 cycles is impressed across the grid of the thyratron 19. As soon as the negative bias passes below a certain value, the thyratron 19 will ignite thereby causing the ignition condenser to discharge and a current impulse to flow through the primary winding of the ignition coil 17. The consequence of this is an intensive voltage impulse affecting the ignition electrode 18 and which ignites the flash tube 4. A relatively weak discharge now takes place in the tube 4 and by which the condenser 12 is caused to discharge.

The anode potential of the thyratron 19, and that is the voltage which is impressed across the condenser 16, has first of all collapsed due to the ignition discharge, so that the thyratron extinguishes. While now the anode potential is again slowly built up via the resistance 15, the negative biasing potential has already reached such a value that it blocks the thyratron. Only at about the end of the next half-wave will the thyratron again be ignited and the operation described is repeated.

Stroboscopic discharges are produced in this manner which have an exactly defined frequency and—through the condenser 12—also a defined energy, so that it is possible already before the exposure to measure accurately the illumination of the image to be taken.

*Flash operation*

After setting has been done, the switches 10 and 22 are adjusted to the position shown in the drawing. Tube 4 is now connected in common manner across the storage condenser 9. The smoothing condenser 23 converts the pulsating negative direct current voltage in a constant negative grid bias which is sufficient constantly to block the thyratron.

As soon as the camera contact 26 is closed, the condenser 23 partially recharges into the condenser 24 whereby—since recharging is effected through the resistor 21 with a certain delay—the negative grid bias of the thyratron 19 is decreased during a short interval and the thyratron ignites. The flash is thereby released once in the manner as described above, and now, it is the big storage condenser 9 which discharges.

After discharge, the thyratron 19 extinguishes as described and while the ignition condenser 16 is again in the process of charging, the condenser 23 has already reached its full potential through the resistance 21 and blocks again the thyratron 19.

The high-ohmic resistance 25 is intended to ensure that the condenser 24, after the opening of the contact 26, again discharges and is ready for a new release.

The condenser 6 has the function of balancing the heavy fluctuations of load caused by the operation of the exposure-setting illumination and thereby relieves the rectifier 5. Only one condenser having a capacity of about 16 µf. is necessary for this purpose.

Through a working contact 27 (Fig. 2) of a relay 28 is the voltage of the rectifier 20 impressed across a green pilot lamp (29) and a red pilot lamp (30), a relay 31 (repeating relay) with opposing winding 32 and a relay 33 (commutator relay) with opposing winding 34. A normally closed contact 35 is connected in series with the lamp 29, and a working contact 36 of the repeating relay 31 is connected in series with the lamp 30, these contacts being designed as a double contact. The relay 33 is connected in series with a normally closed contact 37 of the repeating relay 31, so that the relay 33 can only attract after the relay 31 has released.

The relays 31 and 33 maintain themselves in the attracted position through the self-retaining contacts 38 or 39, respectively, and may be caused to release through the opposing windings 32, 34. The opposing winding 32 is connected in series with a working contact 40 of the repeating relay 31, so that it can only be energized with the relay 31 in the attracted position.

The commutator relay comprises commutator contacts 10 and a normally closed contact 22 through which either the storage condenser 9 (Fig. 1) or the condenser 12 (Fig. 1) is connected across the flash tube 4 (Fig. 1) and the smoothing condenser 23 (Fig. 1 and 2) is switched on or off.

Tube 4 as illustrated in Fig. 1 embodies four separate flash tubes $R_1$, $R_2$, $R_3$ and $R_4$ (Fig. 2) which are connected with the voltages $U_1$, $U_2$, $U_3$ and $U_4$ (Fig. 2) across the separate storage condensers embodied by the condenser 9 in Fig. 1. With equal flash efficiency and operation voltage, the duration of the flash is thereby decreased and difficulties are avoided which otherwise should have to be feared when a greater number of parallel number of parallel connected electrolytic condensers would be employed.

The relay 28 is connected in parallel to the storage condensers 9 via series resistances 41 and an adjusting resistance 42. This relay is so designed that it only attracts when all storage condensers are charged, but so that only one charged storage condenser will suffice to retain it in its working position. This can, if necessary, already be achieved by the magnetic properties of the relay.

Normally, the current required by a relay to attract must be of higher intensity than that which is necessary to hold the relay in its attracted position.

A resistance 43 is additionally connected in series with the relay 28, this resistance 43 being bridged by a working contact 44 of the relay 28, so that the sensitivity of the relay 28 is increased as soon as it has attracted.

The condenser 24 may be connected in parallel with the condenser 23 through a normally closed contact 45 of the repeating relay 31 and the camera contact 26 or a hand operated releasing switch 26a, respectively, which latter switch is connected in parallel to said camera contact 26. The camera contact 26 or 26a, respectively, is bridged by a normally closed contact of the operating relay 28, so that with the relay 28 in the released position, both condensers 23 and 24 are charged and assume the function of smoothing condensers and the closing of contact 26 has no effect whatsoever.

The resistor 15, which is provided for the charging of the ignition condenser 16, consists of two parts, and these are a smaller resistor (approx. 5 kiloohms) and another considerably greater resistor of approx. 200 kiloohms. The greater resistor may be bridged by a working contact 47 of the commutator relay 33. Thereby, it is achieved that the charging of the ignition condenser 16 during the exposure-setting operation (relay 33 attracted) takes place in a considerably shorter interval of time as compared with the time necessary for charging with flash operation, and it is ensured in this manner that double releasing due to unfavourable relay retardation is eliminated.

The opposing winding 32 of the relay 31 is connected in series with a hand operated switch 48 (extinguishing switch) by which the lighting up lamp 30 may be extinguished and the flash-light unit may be made again ready for operation. The windings 33 and 34 lie in series with hand operated "On" or "Off" switches 49, 50 which are provided for the exposure-setting illumination. The switches 48, 49, 50 and also the hand release 26a are designed as press-button switches.

The operation of the relay control is as follows:

Initial state

The storage condenser 9, Fig. 1, and also the condenser 12 are charged. The operating relay 28 is thereby caused to attract. The voltage of the rectifier 20 is impressed across the green pilot lamp 29 through the contact 27 and the contact 35, so that this pilot lamp 29 lights up to indicate that the flash-light unit is ready for operation. Relay 31 is not in the attracted position since the camera contact 26 or 26a, respectively, is opened. Consequently, the voltage is impressed across the commutator relay 33 through the contact 37.

Exposure-setting operation

Relay 33 attracts when the key 49 is pressed. The tubes $R_1$, $R_2$, $R_3$, $R_4$ (4 in Fig. 1) are thereby connected to the condensers 12 and the condenser 23 is switched off by the contact 39. The pulsating direct current of the rectifier 20 thereby affects in its unsmoothed state the grid of the thyratron, so that the tube 4 ignites periodically in the manner which has been described above.

If now the storage condenser 9 is not or not yet charged, the relay 28 has released, the relay 33 receives no current through the contact 27 and therefore fails to attract even if the switch on key 49 is pressed. Thus, the exposure setting illumination cannot be switched on.

Flash operation

The exposure-setting illumination is switched off by pressing the key 50. The condensers are now connected to the tubes $R_1$, $R_2$, $R_3$, $R_4$ (4 in Fig. 1). The smoothing condenser 23 and the thyratron are switched on through the contact 22. After the opening of the contact 47, the ignition condenser is now recharged through both resistors 15 considerably slower than with the exposure-setting operation.

The ignition of the tube takes place in the manner described by connecting the condenser 24 in parallel to the condenser 23 which is effected through the contact 45 and the camera contact 26.

If now the camera contact 26 or the hand operated release 26a is closed, the circuit of the relay 31 is also closed so that this would attract, provided the feed voltage should remain effective. But if the flash tube ignites properly, the voltage of the condenser 9 will collapse, so that the relay 28 releases and the contact 27 opens. As a consequence of the inavoidable time lag of the relay 31, the latter relay will not at all reach the condition in which it is energized enough to attract.

The green pilot lamp 29 will at the same time extinguish by the opening of the contact 27.

If the condenser 9 is not charged and the relay 28 has released, the camera contact 26 is short-circuited by the contact 46 as described and releasing a flash is eliminated.

Failure of flash

If upon closing the camera contact 26 the flash is released and the circuit of the repeating relay 31 is closed, but for any reason, the flash of any of the tubes fails to ignite, the operating relay 28 remains in the attracted position after the flash has been released. Consequently, relay 31 now attracts.

The green instead of the red pilot lamp 30 is then switched on by the relay 31 through the contact 35. Contact 45 opens and switches off the condenser 24, and the self-retaining contact 38 short-circuits the camera contact 26 so that a repeated ignition is impossible.

Contact 37 opens and separates the commutator relay 33, so that the exposure-setting illumination cannot be switched on. If after an exposure has been taken with several flash-light units employed, the exposure-setting illumination is once more switched on, this will give a clear picture of the light distribution of the flash illumination produced during the exposure, even if one of the flash lights should have failed and lighting up of the red pilot lamp has not been noticed.

Fig. 3 shows in schematic illustration the structural setup of the lamp with the four flash tubes $R_1$, $R_2$, $R_3$, $R_4$ (Fig. 2) which are represented by the tube 4 in Fig. 1. These are designed as annular tubes and mounted in horizontal position in a reflector 51.

Fig. 4 shows the circuit arrangement of the tubes $R_1$, $R_2$, $R_3$, $R_4$ with the condensers 12 each of which being formed of a group of four parallel connected electrolytic condensers $52a$ having a capacity of 600 μf. Each of these groups is charged galvanically and separately of the other groups. Instead of separate tubes $R_1$, $R_2$, $R_3$, $R_4$, the four paths of discharge may also be arranged in a common gas filled space.

The invention has been explained in the foregoing by way of a preferred embodiment which has been described in detail. However, this should only be understood as an example of the circuit arrangement and the structural arrangement described and not in a limiting sense, and by which the scope of protection of the arrangement disclosed is not intended to be restricted.

I claim:

1. An electronic flash-light unit for use in photography comprising an electrical circuit including means for connecting an electrical current source, a storage condenser, a flash tube, and means for causing said flash tube to fire, an auxiliary electrical circuit for controlling the operation of said flash-light unit comprising auxiliary switching means, a control switch, and means for causing said auxiliary switching means to be operated by the operation of said control switch, said auxiliary switching means being connected in said electrical circuit, and an operating relay having its coil connected across the terminals of said storage condenser and being responsive to the voltage developed across said terminals and having its armature contacts connected in said auxiliary circuit, whereby the operation of said flash-light unit is controlled by the state of charge of said storage condenser.

2. An electronic flash-light unit according to claim 1 having a signaling device arranged in said auxiliary circuit.

3. An electronic flash-light unit according to claim 1 wherein said auxiliary switching means comprises a repeating relay arranged in said auxiliary circuit wherein said relay is energized to attract when said flash releasing switch is closed.

4. An electronic flash-light unit according to claim 3 wherein said repeating relay has an opposing winding, said opposing winding being connected in series in a circuit comprised of a hand operated switch, and a working contact of said repeating relay.

5. An electronic flash-light unit for use in photography comprising an electrical circuit including means for connecting an electrical current source, a storage condenser, a flash tube, and means for causing said flash tube to fire, an auxiliary electrical circuit for switching said flashlight unit from flash operation to exposure-setting illumination operation comprising a commutator relay and a hand operated switch, and an operating relay having its coil connected across the terminals of said storage condenser and being responsive to the voltage developed across said terminals and having its armature contacts connected in said auxiliary circuit, whereby said flashlight unit may be switched over from flash operation to exposure-setting operation by the operation of said switch only when said storage condensers are fully charged.

6. An electronic flash-light unit according to claim 5 wherein said auxiliary circuit additionally contains a repeating relay and a flash releasing contact switch for operating said repeating relay, and wherein that portion of said auxiliary circuit comprising the coil of the commutator relay is in series with a normally closed contact of said repeating relay.

7. An electronic flash-light unit according to claim 5 wherein said commutator relay connects a high-capacity storage condenser to said flash tube for producing a normal flash-discharge in its released position and wherein said commutator relay connects a smaller condenser for supplying exposure-setting discharges to said flash tube in its attracted position.

8. An electronic flash-light unit according to claim 7 having a thyratron connected in said electrical circuit for igniting said flash tube to form stroboscopic exposure-setting illumination, a pulsating negative direct current means connected to said thyratron for firing said thyratron, and a smoothing condenser connected to the grid of said thyratron through a normally closed contact of said commutator relay, whereby said thyratron is blocked by the smoothed control voltage produced by said smoothing condenser when said commutator relay is in the released condition.

9. An electronic flash-light unit according to claim 8 wherein a second condenser is connected in parallel with the smoothing condenser and a resistance is connected in series with said smoothing condenser, whereby the recharging of said smoothing condenser through said series resistance is effected so slowly that a short interval decrease of the negative grid potential of said thyratron through the parallel connection takes place which is sufficient to ignite the thyratron.

10. An electronic flash-light unit according to claim 7 having an ignition condenser and an ignition transformer through which said ignition condenser may be discharged, and wherein a relatively low-ohmic resistance and a relatively high-ohmic resistance are connected in series with said ignition condenser, and wherein a working contact of said commutator relay is connected across said highohmic resistance, whereby said ignition condenser is charged at a low rate when said comutator relay is in its released position and at a high rate when said commutator relay is in its attracted position.

11. An electronic flash-light unit for use in photography comprising an electrical circuit including means for connecting an electrical current source, a plurality of storage condensers, a plurality of flash tubes connected one to each of said storage condensers, and means for causing said flash tubes to fire, an auxiliary electrical circuit for controlling the operation of said flash-light unit comprising auxiliary switching means, a control switch, and means for causing said auxiliary switching means to be operated by the operation of said control switch, said auxiliary switching means being connected in said electrical circuit, and an operating relay having its coil connected across the terminals of each of said storage condensers and being responsive to the voltages developed across said terminals and having its armature contact connected in said auxiliary circuits, whereby the operation of said flash-light unit is controlled by the state of charge of said storage condensers.

12. An electronic flash-light unit according to claim 11 wherein said operating relay is connected in parallel with all said storage condensers, and wherein said relay is so designed and adjusted that it attracts only if all condensers are charged, but will be retained in its attracted position even when only one condenser is charged.

13. An electronic flash-light unit according to claim 12 having a resistor in series with the coil of said operating relay, and having a short circuiting bridge across said resistor in series with a working contact of said operating relay for varying the sensitivity of said operating relay.

14. An electronic flash-light unit according to claim 12 wherein a normally closed contact of said operating relay is arranged in parallel with a flash release switch, whereby said flash release switch is rendered ineffective for firing said flash tube until said storage condensers are charged.

15. An electronic flash-light unit for use in photography comprising an electrical circuit including means for connecting an electrical current source, a storage condenser, a flash tube, and means for causing said flash tube to fire, and an auxiliary circuit for optionally producing either an intense main discharge or periodic weaker auxiliary discharges for stroboscopic exposure-setting illumination, a voltage stabilizer so connected in said circuit that charging the storage condenser for the main discharge is effected through said voltage stabilizer, while the voltage for the stroboscopic exposure-setting illumination is tapped before the stabilizer, and having a condenser connected in series with said tapped voltage for balancing the load fluctuations caused by said exposure setting illumination.

16. An electronic flash-light unit for use in photography comprising an electrical circuit including means for connecting an electrical current source, a storage condenser, a flash tube, means for causing said flash tube to fire, and an auxiliary circuit for optionally causing an intense main discharge for photographic exposure or periodic weaker auxiliary discharges for stroboscopic exposure-setting illumination to be produced in said flash tube, said auxiliary circuit including an ignition condenser, a thyratron, and means for supplying a pulsating negative direct current to the grid of said thyratron, said ignition condenser being connected to said thyratron for being discharged therethrough, and means for diminishing the pre-charging rate of said ignition condenser after each discharge to such a degree that the following half-wave of the grid potential blocks said thyratron before the anode voltage necessary for a new ignition is reached.

17. An electronic flash-light unit according to claim 16 having a smoothing condenser which may be switched into said pulsating direct current for blocking said thyratron.

18. An electronic flash-light unit according to claim 17 having a second condenser connected in parallel with said smoothing condenser and having a switch in series with said second condenser, whereby said smoothing condenser is so slowly charged through a charging resistor that a short period decrease of the negative grid potential takes place through said parallel connection which results in igniting said thyratron.

19. In an electronic flash-light unit for use in photography comprising an electrical circuit including means for connecting an electrical current source, a plurality of at least seven storage condensers, a flash tube, a means for causing said flash tube to fire, the improvement which comprises connecting said storage condensers to form groups of no more than four parallel connected condensers in each group, each of which groups discharges at the same time through a separate path of discharge.

References Cited in the file of this patent

UNITED STATES PATENTS

| | | |
|---|---|---|
| 1,876,058 | Kayser | Sept. 6, 1932 |
| 1,979,692 | Knowles | Nov. 6, 1934 |
| 2,606,308 | Parker | Aug. 5, 1952 |
| 2,622,229 | Lord | Dec. 16, 1952 |

FOREIGN PATENTS

| | | |
|---|---|---|
| 1,082,931 | France | June 23, 1954 |